United States Patent

Gorbaty

[15] 3,679,683
[45] July 25, 1972

[54] BARBITURATE 3-N-METHYLENE PHOSPHATES

[72] Inventor: Martin L. Gorbaty, Elizabeth, N.J.
[73] Assignee: Esso Research and Engineering Company
[22] Filed: May 11, 1970
[21] Appl. No.: 36,430

[52] U.S. Cl.................260/257, 260/256.4 E, 260/256.4 C, 260/256.5 R, 260/260, 424/200
[51] Int. Cl.....................................C07d 51/20, C07d 51/24
[58] Field of Search...............................260/257, 260, 256.4

[56] References Cited

UNITED STATES PATENTS 3,270,019   8/1966   Friedlander et al....................260/260

Primary Examiner—Alex Mazel
Assistant Examiner—Anne Marie T. Tighe
Attorney—Chasan and Sinnock and John Paul Corcoran

[57] ABSTRACT

Barbiturate phosphates characterized by the following structural formula:

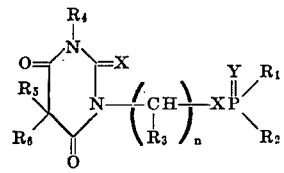

wherein $R_1$ and $R_2$ are each selected from the group consisting of $C_1$–$C_6$ alkoxy, $C_1$–$C_6$ thioalkyl, $C_1$–$C_6$ alkyl, $C_3$–$C_6$ alkoxyalkyl, phenyl, phenoxy, thiophenyl, wherein said groups can be optionally substituted with chlorine, bromine, nitrile or nitro; $R_1$ and $R_2$ may or may not be the same; $R_3$ is one selected from the group consisting of hydrogen, $C_1$–$C_6$ alkyl, optionally substituted with chlorine or bromine; $R_4$ is one selected from the group consisting of hydrogen, $C_1$–$C_6$ alkyl, optionally substituted with chlorine or bromine, phenyl, bromo or chloro-substituted phenyl, $C_1$–$C_4$ alkylamino, $C_2$–$C_4$ dialkylamino, $C_2$–$C_4$ acyl, $C_1$–$C_4$ thioalkyl, $C_1$–$C_4$ alkylsulfoxide, $C_1$–$C_4$ alkylsulfone, $C_2$–$C_4$ alkoxyalkyl, $C_2$–$C_6$ alkenyl, $C_3$–$C_6$ alkynyl; $R_5$ and $R_6$ are each selected from the group consisting of $C_1$–$C_6$ alkyl, phenyl, $C_1$–$C_6$ chloro or bromo-substituted alkyl, $C_1$–$C_4$ alkylthio, thiophenyl optionally substituted by chlorine, bromine, $C_1$–$C_4$ alkyl or nitro, $C_1$–$C_4$ alkylsulfoxide, $C_1$–$C_4$ alkylsulfonyl, $C_1$–$C_4$ alkoxy, $C_2$–$C_5$ alkoxyalkyl, $C_1$–$C_6$ monoalkylamino and $C_2$–$C_6$ dialkyl amino, cyano, thiocyano, $C_2$–$C_6$ alkenyl, $C_3$–$C_6$ alkynyl, nitro, $C_3$–$C_6$ cycloalkyl and $C_5$–$C_6$ cycloalkenyl wherein $R_5$ and $R_6$ may or may not be the same; X and Y can be 0 or S; and $n$ is an integer ranging from 1 to 3. Such compounds have been found to possess highly active contact and systemic insecticidal and miticidal activity.

16 Claims, No Drawings

BARBITURATE 3-N-METHYLENE PHOSPHATES

This invention relates to phosphate derivatives of barbiturates. In one aspect, this invention relates to 3-N-alkyl phosphate derivatives of barbituric acids. In other aspect this invention relates to the use of these compounds as pesticides and more particularly as insecticides and miticides.

The compounds of the subject invention are characterized by the following structural formula:

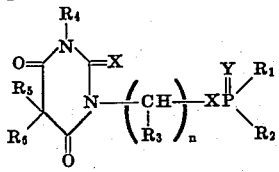

wherein $R_1$ and $R_2$ are each selected from the group consisting $C_1$—$C_6$ alkoxy, $C_1$—$C_6$ thioalkyl, $C_1$—$C_6$ alkyl, $C_3$—$C_6$ alkoxyalkyl, phenyl, phenoxy, thiophenyl, wherein said groups can be optionally substituted with chlorine, bromine, nitrile or nitro; $R_1$ and $R_2$ may or may not be the same; $R_3$ is one selected from the group consisting of hydrogen, $C_1$—$C_6$ alkyl, optionally substituted with chlorine or bromine; $R_4$ is one selected from the group consisting of hydrogen, $C_1$—$C_6$ alkyl, optionally substituted with chlorine or bromine, phenyl, bromo or chloro-substituted phenyl, $C_1$—$C_4$ alkylamino, $C_2$—$C_4$ dialkylamino, $C_2$—$C_4$ acyl, $C_1$—$C_4$ thioalkyl, $C_1$—$C_4$ alkylsulfoxide, $C_1$—$C_4$ alkylsulfone, $C_2$—$C_4$ alkoxyalkyl, $C_2$—$C_6$ alkenyl, $C_3$—$C_6$ alkynyl; $R_5$ and $R_6$ are each selected from the group consisting of $C_1$—$C_6$ alkyl, phenyl, $C_1$—$C_6$ chloro or bromo-substituted alkyl, $C_1$—$C_4$ alkylthio, thiophenyl optionally substituted by chlorine, bromine, $C_1$—$C_4$ alkyl or nitro, $C_1$—$C_4$ alkylsulfoxide, $C_1$—$C_4$ alkylsulfonyl, $C_1$—$C_4$ alkoxy, $C_2$—$C_5$ alkoxyalkyl, $C_1$—$C_6$ monoalkylamino and $C_2$—$C_6$ dialkylamino, cyano, thiocyano, $C_2$—$C_6$ alkenyl, $C_3$—$C_6$ alkynyl, nitro, $C_3$—$C_6$ cycloalkyl and $C_5$—$C_6$ cycloalkenyl wherein $R_5$ and $R_6$ may or may not be the same; X and Y can be O or S; and $n$ is an integer ranging from 1 to 3. Such compounds have been found to possess highly active contact and systemic insecticidal and miticidal activity.

Exemplary of those compounds coming within the scope of this invention are the following:

1. S-[1,5-diethyl-5-methylmercaptobarbituryl-3-(1-ethyl)]-O-ethyl-S-methylphosphorodithioate
2. S-[1-methyl-5,5-diethylbarbituryl-3-methyl]-O,O-dimethylphosphorothioate
3. S-[1,5,5-trimethylbarbituryl-3-methyl]-ethyl-O-ethyl-phosphonodithioate
4. S-[1,5-dimethyl-5-(1-cyclohexenyl)barbituryl-3-methyl]-O-ethyl-S-propylphosphorodithioate
5. S-[1-ethyl-5-methyl-5-ethylbarbituryl-3-(2-chloroethyl)]-O,O-dimethylphosphorothioate
6. S-[1-allyl-5-methyl-5-propylbarbituryl-3-(1-ethyl)]-O-ethyl-S-cyclohexylphosphorodithioate
7. S-[1-methyl-5,5-dimethylmercaptobarbituryl-3-(2-bromo-ethyl)]-phenyl-O-ethylphosphonothioate
8. S-[1-propargyl-5-propyl-5-cyanobarbituryl-3-benzyl]-O-methyl-S-phenylphosphorodithioate
9. S-[1-ethoxy-5-ethyl-5-thiocyanobarbituryl-3-(4-bromobenzyl)]-O-phenyl-S-propylphosphorodithioate
10. S-[1,5-dimethyl-5-dimethylaminobarbituryl-3-methyl]-O-ethyl-O-4-chlorophenylphosphorothioate
11. S-[1-(2-methoxyethyl)-5-(2-chloroethyl)-5-methylsulfonylbarbituryl-3-(2-ethyl)]-O,O-dimethylphosphorothioate
12. S-[1-(2-methylmercaptoethyl)-5-methyl-5-cyclopentylbarbituryl-3-methyl]-O-cyclohexyl-S-propylphosphorodithioate
13. S-[1-phenyl-5-ethoxy-5-methylsulfinylbarbituryl-3-(3-propyl)]-cyclopentyl-O-propylphosphonodithioate
14. S-[1,5-dimethyl-5-propylbarbituryl-3-methyl]-O,O-dimethylphosphorothioate
15. S-[1-methylsulfonyl-5-methyl-5-phenylbarbituryl-3-methyl]-O,O-diethylphosphorothioate
16. S-[1-dimethylamino-5-propargyl-5-(4-chlorophenyl)barbituryl-3-methyl]-O-ethyl-S-propylphosphorodithioate
17. S-[1-acetyl-5-ethyl-5-(2-methoxyethyl)barbituryl-3-(2-ethyl)]-O,O-dimethylphosphorothioate
18. S-[1-(2-chloroethyl)-5-methyl-5-nitrobarbituryl-3-methyl]-S,S-dipropylphosphorotrithioate
19. S-[1,5,5-trimethylbarbituryl-3-methyl]-O,O-diethylphosphorothioate
20. S-[1,5,5-trimethylbarbituryl-3-methyl]-O,O-diethylphosphorodithioate
21. S-[1,5,5-trimethylbarbituryl-3-methyl]-O,O-dimethylphosphorodithioate
22. S-[1,5,5-trimethylbarbituryl-3-methyl]-O,O-dimethylphosphorothioate
23. S-[1,5,5-trimethylbarbituryl-3-methyl]-O-ethyl-S-propylphosphorodithioate
24. S-[1,5-dimethyl-5-(1-cyclohexenyl)barbituryl-3-methyl]-O,O-dimethylphosphorothioate
25. S-[1,5-dimethyl-5-(1-cyclohexenyl)barbituryl-3-methyl]-O,O-diethylphosphorothioate
26. S-[1,5-dimethyl-5-(1-cyclohexenyl)barbituryl-3-methyl]-O,O-dimethylphosphorodithioate
27. S-[1,5-dimethyl-5-(1-cyclohexenyl)barbituryl-3-methyl]-O,O-diethylphosphorodithioate
28. S-[1,5-dimethyl-5-(1-cyclohexenyl)barbituryl-3-methyl]-ethyl-O-ethylphosphonodithioate
29. S-[1-methyl-5,5-diethylbarbituryl-3-methyl]-O-ethyl-S-propylphosphorodithioate
30. S-[1-methyl-5,5-diethylbarbituryl-3-methyl]-ethyl-O-ethyl-phosphonodithioate
31. S-[1-methyl-5-ethyl-5-phenylbarbituryl-3-methyl]-O,O-dimethylphosphorothioate
32. S-[1-methyl-5,5-diethylbarbituryl-3-methyl]-O,O-diethylphosphorothioate
33. S-[1-methyl-5,5-diethylbarbituryl-3-methyl]-O,O-diethylphosphorodithioate
34. S-[1-methyl-5,5-diethylbarbituryl-3-methyl]-O,O-dimethylphosphorodithioate The foregoing compounds can be readily prepared by the following method which is represented schematically:

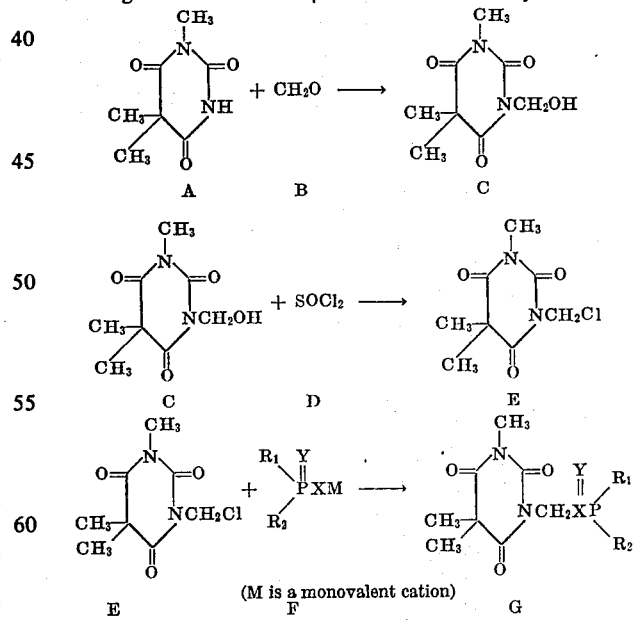

| Reactants | Mole ratios | Temp. (° C.) | Pressure (atm.) | Solvent |
|---|---|---|---|---|
| A+B | 1:1-1:5 | 80-120 | 1-10 | H₂O, dimethylsulfoxide, ethanol. |
| Preferred | 1:3 | 100 | 1 | H₂O. |
| C+D | 1:1-1:5 | 20-100 | 1-10 | Benzene, toluene, chloroform, methylene chloride. |
| Preferred | 1:2 | 60-80 | 1 | Chloroform. |
| E+F | 1:1-1:5 | 30-100 | 1-10 | Chloroform, benzene, methylene chloride, acetonitrile, toluene, xylene, tetrahydrofuran. |
| Preferred | 1:1.1 | 80 | 1 | Acetonitrile. |

Preparation of 1,5,5-trisubstituted barbituric acids (Reagent A) are well documented in the chemical literature, and form no part of the present invention.

Compounds characterized by the structural formula:

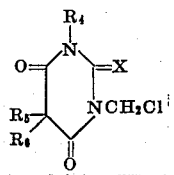

wherein $R_4$, $R_5$ and $R_6$ are as defined hereinbefore, and X is either O or S, are novel and find utility as intermediates in the preparation of the compounds of the subject invention. They also possess soil fungicide activity.

The compounds of the invention have general insecticidal properties.

Insecticidal compositions of the invention are prepared by admixing one or more of the active ingredients defined heretofore, in insecticidally effective amounts with a conditioning agent of the kind used and referred to in the art as a pest control adjuvant or modifier to provide formulations adapted for ready and efficient application using conventional applicator equipment.

Thus, the insecticidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cotton-seed flours. Other inert solid conditioning agents or carriers of the kind conventionally employed in preparing pest control compositions in powdered form can be used.

Granulars can be compounded by adsorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredients with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50 percent by weight or more concentration of the active ingredient can be obtained in solution.

The insecticidal compositions of the invention, whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkyl-naphthalene sodium sulfonate, sodium salts of sulfonated condensation products of naphthalene and formaldehyde, sodium lauryl sulphate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15 percent by weight of the composition, and in certain compositions the percentage will be 1 percent or less. Usually, the minimum lower concentration will be 0.1 percent.

The active compound is, of course, applied in an amount sufficient to exert the desired insecticidal action. The amount of the active compound present in the compositions as actually applied for destroying insects will vary with the manner of application, the particular insects for which control is sought, the purpose for which the application is being made, and like variables. In general, the insecticidal compositions as applied in the form of a spray, dust or granular, will contain from about 0.1 to 100 percent by weight of the active compound.

Fertilizer materials, other insecticidal agents, and other pest control agents such as herbicides and fungicides can be included in the insecticidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals — although subsequently subjected to grinding, sieving, purification, and/or other treatments — including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present nitrated aryl compounds.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax". Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75 percent and preferably of at least about 90 percent, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90 percent by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10 percent by weight, of active material based on the total weight of the composition are satisfactory, although lower and higher concentrations can be applied if necessary.

The compositions of this invention can also be formulated as dusts. These comprise an intimate admixture of the active ingredient and a finely-powdered solid carrier such as aforedescribed. The powdered carriers can be oil-treated to improve adhesion to the surface to which they are applied. These dusts can be concentrates, in which case a highly-sorptive carrier is preferably used. These require dilution with the same or different finely-powdered carrier, which can be of low sorptive capacity, to a concentration suitable for application.

The compositions of the invention can be formulated as wettable powders comprising a major proportion of the active ingredient mixed with a dispersing, i.e., deflocculating or suspending agent, and if desired, a finely-divided solid carrier and/or a wetting agent. The active ingredient can be in particulate form or adsorbed on the carrier and preferably constitutes at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731", are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "- Teepol", sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely-divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons, etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50 percent by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

Example 1 - Preparation of 1,5,5-Trimethyl-3-Chloromethylbarbituric Acid

A mixture of 32.0 g. (0.15 mole) of 1,5,5-trimethylbarbituric acid and 50 g. (0.56 mole) of 37 percent aqueous formaldehyde in 300 ml. of water was heated to reflux for 16 hours. The water was removed in vacuo, the residue taken up in 250 ml. of chloroform, dried (MgSO$_4$) and the solvent removed in vacuo to give 40.7 g. of crude hydroxymethylated product. This was taken up in 100 ml. of chloroform, 30 ml. (0.45 mole) of thionyl chloride was added and the mixture heated to reflux for 3 hours. The solvent was removed in vacuo, the residue taken up in toluene, washed 4 times with 50 ml. of water and dried (MgSO$_4$). The solvent was removed in vacuo to afford 28.1 g. of yellow oil, whose infrared and nmr spectra confirmed the structure.

Example 2 - Preparation of 1,5-dimethyl-3-chloromethyl-5-(1-cyclohexenyl) barbituric Acid A mixture of 246 g. (1.05 mole) of 1,5-dimethyl-5-(1-cyclohexenyl) barbituric acid, 230 ml (3.0 mole) of 37 percent aqueous formaldehyde, 300 ml of water and 500 ml of ethanol was heated to reflux for 18 hours. The lower phase was separated, dissolved in 500 ml of chloroform, dried (Mg- SO₄) and the solvent removed to afford 254 g. of crude hydroxymethylated material. To 100 g. (0.38 mole) of the latter dissolved in 600 ml of chloroform was added 60 ml (0.75 mole) of thionyl chloride, the mixture heated to reflux for 3 hours, the solvent stripped, the residue triturated with toluene and filtered. The filtrate was stripped in vacuo to afford 60.4 g. of a viscous oil, whose nmr and infrared spectra confirmed the structure.

Anal: Calcd. for $C_{13}H_{17}N_2O_3Cl$: C,54.98; H,5.98; N,9.85
    Found: C,56.09; H,6.06; N,10.97

Example 3 - Preparation of 1-Methyl-3-Chloromethyl-5,5-Diethylbarbituric Acid This compound, isolated as a viscous oil was prepared by the method described in Example 2. Nmr and infrared spectra confirmed the structure.
Anal. Calc'd. for $C_{10}H_{15}N_2O_3Cl$: C, 48.75; H, 6.09; N, 11.39
    Found: C, 50.84; H, 6.43; N, 11.70

Example 4 - Preparation of S-[1,5,5-Trimethylbarbituryl-3-Methyl]-0,0-Dimethylphosphorothioate (Cpd. 22)

To a solution of 4.0 g. (0.018 mole) 1,5,5-trimethyl-3-chloromethylbarbituric acid in 250 ml of acetonitrile was added 3.02 g. (0.019 mole) of ammonium 0,0-dimethylphosphorothioate. The mixture was stirred at ambient temperature for 1 hour, then heated to 70° for 2 hours. The mixture was filtered, the solvent removed in vacuo, the residue taken up in 200 ml. of chloroform and washed 4 times with 25 ml. of water. After drying (MgSO₄), the solvent was removed in vacuo and the residue heated to 80°/0.1 mm. for 1 hour to give 2.8 g. of product, whose nmr and infrared spectra confirmed the structure.
Anal. Calc'd. for $C_{10}H_{17}N_2O_6SP$: C, 37.01; H, 5.25; N, 8.65
    Found: C, 36.85; H, 5.30; N, 8.76

Example 5 - Preparation of S-[1,5,5-Trimethylbarbituryl-3-Methyl]-0-Ethyl-S-Propylphosphorodithioate (Cpd.23)

This compound was prepared according to procedures set forth in Example 4. The product was an oil, whose nmr and infrared spectra confirmed the structure.
Anal. Calc'd.: C, 40.95; H, 6.05; N, 7.32
    Found: C, 42.28; H, 6.37; N, 8.02

Example 6 - Preparation of S-[1,5,5-Trimethylbarbituryl-3-Methyl]-0,0-Diethylphosphorothioate (cpd. 19)

This compound was prepared according to procedures set forth in Example 4. The product was an oil, whose nmr and infrared spectra confirmed the structure.
Anal. Calc'd.: C,40.8;H,5.95;N,7.95
    Found: C,39.27;H,5.99;N,6.73

Example 7 - Preparation of S-[1,5,5-Trimethylbarbituryl-3-Methyl]-0,0-Diethylphosphorodithioate (cpd. 20)

This compound was prepared according to procedures set forth in Example 4. The product was an oil, whose nmr and infrared spectra confirmed the structure.

Example 8 - Preparation of S-[1,5,5-Trimethylbarbituryl-3-Methyl]-0,0-Dimethylphosphorodithioate (cpd. 21)

This compound was prepared according to procedures set forth in Example 4. The product was an oil, whose nmr and infrared spectra confirmed the structure.

Example 9 - Preparation of S-[1,5-Dimethyl-5-(1-Cyclohexenyl)-Barbituryl-3-Methyl]-0,0-Dimethylphosphorodithioate (cpd. 26)

This compound was prepared according to procedures set forth in Example 4. The product was an oil, whose nmr and infrared spectra confirmed the structure.
Anal. Calc'd.: C,44.31;H,5.66;N,6.91;P,7.65
    Found: C,44.18;H,5.91;N,6.81;P,7.02

Example 10 - Preparation of S-[1,5-Dimethyl-5-(1-Cyclohexenyl)-Barbituryl-3-Methyl]-0-Ethyl-S-Propylphosphorodiothioate (cpd. 4)

This compound was prepared according to procedures set forth in Example 4. The product was an oil, whose nmr and infrared spectra confirmed the structure.
Anal. Calc'd.: C,45.58; H,6.51; N,6.25
    Found: C,46.67; H,6.16; N,6.20

Example 10a - Preparation of S-[1-Methyl-5,5-Diethyl-Barbituryl-3-Methyl]-0,0-Dimethylphosphorothioate (Cpd. 2)

The compound was prepared according to the procedures set forth in Example 4. The product was an oil, whose nmr and infrared spectra confirmed the structure.

Example 10b - Preparation of S-[1-Methyl-5,5-Diethyl-Barbituryl-3-Methyl]-0-Ethyl-S-Propylphosphorodithioate (Cpd. 29)

The compound was prepared according to procedures set forth in Example 4. The product was a viscous oil, whose nmr and infrared spectra confirmed the structure.
Anal. Calc'd. for $C_{15}H_{27}N_2O_5PS_2$: C, 43.81; H, 6.58; N, 6.83
    Found: C, 44.20; H, 6.50; N, 7.80

Example 11 - Preparation of S-1,5-Dimethyl-5-(1-Cyclohexenyl)-Barbituryl-3-Methyl]-0,0-Diethylphosphorothioate (cpd. 25)

The compound was prepared according to procedures set forth in Example 4. The product was an oil, whose nmr and infrared spectra confirmed the structure.
Anal. Calc'd.: C,48.80; H,6.45; N,6.71
    Found: C,46.13; H,6.16; N,6.61

Example 12 - Preparation of S-[1,5-Dimethyl-5-(1-Cyclohexenyl)-Barbituryl-3-Methyl]-0,0-Diethylphosphorodithioate (cpd. 27)

The compound was prepared according to procedures set forth in Example 4. The product was a viscous oil, whose nmr and infrared spectra confirmed the structure.

Example 13 - Preparation of S-[1,5-Dimethyl-5-(1-Cyclohexenyl)-Barbituryl-3-Methyl]-0,0-Dimethylphosphorothioate (cpd. 24)

The product was prepared according to the procedures set forth in Example 4. The product was a viscous oil, whose nmr and infrared spectra confirmed the structure.

Example 14 - Preparation of S-[1,5,5-Trimethylbarbituryl-3-Methyl]-Ethyl-0-Ethylphosphonodithioate (cpd 3)

To a solution of 4.0 g. (0.0183 mole) of 1,5,5-trimethyl-3-chloromethylbarbituric acid and 3.12 g. (0.0183 mole) of ethyl 0-ethyldithiophosphonic acid in 150 ml of acetonitrile was added dropwise, with stirring, a solution of 1.85 g. (0.0183 mole) of triethylamine in 10 ml. of acetonitrile. The solution was stirred at room temperature for 1 hour, then heated to reflux for 2 hours. The solvent was removed in vacuo, the residue taken up in 300 ml. of benzene and filtered. The filtrate was washed successively with 50 ml. of water, 50 ml. of a saturated sodium bicarbonate solution, and twice with 50 ml. of water. After drying (MgSO₄), the solvent was removed in vacuo and placed under high vacuum (0.1 mm) for 1 hour to afford 4.1 g. of a light yellow oil whose infrared and nmr spectra confirm the structure.
Anal. Calc'd. for $C_{12}H_{21}N_2O_5PS_2$: C, 40.91; H, 5.96; N, 7.91; P, 8.80
    Found: C, 41.57; H, 6.57; N, 5.87; P, 9.03

Example 15 - Preparation of S-[1-Methyl-5,5-Diethylbarbituryl-3-Methyl]-Ethyl-0-Ethylphosphonodithioate (Cpd.30)

The above compound was prepared according to the procedures outlined in Example 14. The product was a yellow oil, whose infrared and nmr spectra confirm the structure.

Example 16 - Preparation of S-[1,5-Dimethyl-5-(1-Cyclohexenyl)Barbituryl-3-Methyl]-Ethyl-O-Ethylphosphonodithioate (Cpd. 28)

The above compound was prepared according to the procedures outlined in Example 14. The product was a yellow oil whose infrared and nmr spectra confirm the structure.

General Experimental Procedures for Biological Testing

In the examples which follow, the barbiturate phosphates were treated in the greenhouse and in the laboratory to determine their biological activity.

The experimental compounds were tested as aqueous emulsions. These emulsions were prepared by dissolving the compound in acetone and dispersing it in distilled water with Triton X-100, an alkylaryl polyether alcohol derived by the reaction of i-cetyl phenol with ethylene oxide, to give spray emulsions containing the desired concentration of the compound. These emulsions were then used in standard laboratory tests described below.

Mexican Bean Beetle:

Bean leaves were dipped in the emulsion of the test chemical and allowed to dry. The individual treated leaves were placed in Petri dishes and five Mexican bean beetle larvae introduced into each of the two replicate dishes.

Mites, Contact:

Potted bean plants infested with the two-spotted spider mites were placed on a turntable and sprayed with a formulation of the test chemical. The plants were held for 7 days and the degree of mite control was rated after this period.

Mites, Systemic:

Bean plants were treated by applying 20 ml. of the formulated test chemical to the soil. The mites were transferred to the plants after 24 hours. The plants were held for seven more days and the degree of mite control rated.

Aphid, Contact:

Potted nasturtium plants infested with the bean aphids were placed on a turntable and sprayed with a formulation of the test chemical. The plants were held for two days and the degree of aphid control was rated.

Aphid, Systemic:

Nasturtium plants were treated by applying 20 ml. of the formulated test chemical to the soil. The aphids were transferred to the plants after 24 hours. The plants were held for 48 additional hours and the degree of the Aphid control rated.

Housefly:

Caged houseflies were sprayed with the formulated test chemical. After 2 days the degree of housefly control was rated.

Boll Weevil:

Five mixed sex adult Boll weevils placed in a wire screen cage were sprayed with the proper concentration of formulated test chemical. The boll weevils were provided with sucrose solution on a filter paper. The cages were held at about 70° F. for 24 hours and the percent mortality read after 24 hours.

TABLE I.—BIOLOGICAL ACTIVITY OF BARBITURATE PHOSPHATES*

| Compound No. | Compound | Mex. bean beetle | Southern army worm | Mite contact Adult | Mite contact Nymph | Mite systemic Adult | Mite systemic Nymph | Aphid Contact | Aphid Systemic | Housefly | Boll-weevil |
|---|---|---|---|---|---|---|---|---|---|---|---|
| 22 | S-[1,5,5-trimethylbarbituryl-3-methyl]-O,O-dimethylphosphorothioate. | 100 | 0 | 100 | 100 | 100 | 100 | 100 | 90 | 80 | 100 |
| 23 | S-[1,5,5-trimethylbarbituryl-3-methyl]-O-ethyl-S-propylphosphorodithioate. | 100 | 65 | 100 | 100 | 100 | 100 | 90 | 50 | 100 | |
| 21 | S-[1,5,5-trimethylbarbituryl-3-methyl]-O,O-dimethylphosphorodithioate. | 100 | 0 | 100 | 100 | 100 | 100 | 20 | 70 | | |
| 20 | S-[1,5,5-trimethylbarbituryl-3-methyl]-O,O-diethylphosphorodithioate. | 100 | 0 | 100 | 100 | 100 | 100 | 30 | 0 | | |
| 19 | S-[1,5,5-trimethylbarbituryl-3-methyl]-O,O-diethylphosphorothioate. | 100 | 0 | 100 | 100 | 100 | 100 | 90 | 70 | | |
| 3 | S-[1,5,5-trimethylbarbituryl-3-methyl]-ethyl-O-ethyl-phosphonothioate. | 100 | 100 | 100 | 100 | 90 | 90 | 100 | 60 | | |
| 4 | S-[1,5-dimethyl-5-(1-cyclohexenyl)barbituryl-3-methyl]-O-ethyl-S-propylphosphorodithioate. | 100 | 100 | 90 | 80 | 0 | 0 | 20 | 0 | | |
| 25 | S-[1,5-dimethyl-5-(1-cyclohexenyl)barbituryl-3-methyl]-O,O-diethylphosphorothioate. | 60 | 0 | 20 | 10 | 10 | 0 | 20 | 10 | | |
| 27 | S-[1,5-dimethyl-5-(1-cyclohexenyl)barbituryl-3-methyl]-O,O-diethylphosphorodithioate. | 100 | 0 | 30 | 10 | 0 | 0 | 0 | 0 | | |
| 26 | S-[1,5-dimethyl-5-(1-cyclohexenyl)barbituryl-3-methyl]-O,O-dimethylphosphorodithioate. | 100 | 0 | 10 | 0 | 0 | 0 | 20 | 0 | | |
| 24 | S-[1,5-dimethyl-5-(1-cyclohexenyl)barbituryl-3-methyl]-O,O-dimethylphosphorothioate. | 100 | 0 | 10 | 0 | 100 | 100 | 0 | 20 | | |
| 28 | S-[1,5-dimethyl-5-(1-cyclohexenyl)barbituryl-3-methyl]-ethyl-O-ethylphosphonodithioate. | 100 | 0 | 40 | 20 | 0 | 0 | 10 | 50 | | |
| 2 | S-[1-methyl-5,5-diethylbarbituryl-3-methyl]-O,O-dimethylphosphorothioate. | 100 | 20 | 100 | 100 | 100 | 100 | 50 | 20 | | |
| 29 | S-[1-methyl-5,5-diethylbarbituryl-3-methyl]-O-ethyl-S-propylphosphorodithioate. | 60 | 100 | 0 | 0 | 0 | 0 | 90 | 40 | | |
| 30 | S-[1-methyl-5,5-diethylbarbituryl-3-methyl]-ethyl-O-ethylphosphonodithioate. | 100 | 0 | 100 | 100 | 10 | 0 | 100 | 40 | | |

* All tests except southern army worm were run at 250 p.p.m. concentration. Southern army worm was run at 500 p.p.m. concentration.

What is claimed is:

1. A compound, said compound being one selected from the group of compounds characterized by the following structural formula:

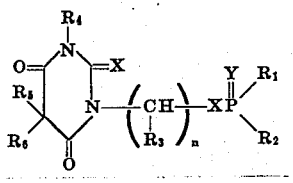

wherein $R_1$ and $R_2$ are each selected from the group consisting of $C_1$–$C_6$ alkoxy, $C_1$–$C_6$ thioalkyl, $C_1$–$C_6$ alkyl, $C_3$–$C_6$ alkoxyalkyl, phenyl, phenoxy, thiophenyl, wherein said groups are optionally substituted with chlorine, bromine, nitrile or nitro, $R_1$ and $R_2$ may or may not be the same; $R_3$ is one selected from the group consisting of hydrogen, $C_1$–$C_6$ alkyl, optionally substituted with chlorine or bromine, $R_4$ is one selected from the group consisting of hydrogen, $C_1$–$C_6$ alkyl, optionally substituted by chlorine or bromine, phenyl, bromo or chloro-substituted phenyl, $C_1$–$C_4$ alkylamino, $C_2$–$C_4$ dialkylamino, acetyl, $C_1$–$C_4$ thioalkyl, $C_1$–$C_4$ alkylsulfoxide, $C_1$–$C_4$ alkylsulfone, $C_2$–$C_4$ alkoxy alkyl, $C_2$–$C_6$ alkenyl, $C_3$–$C_6$ alkynyl; $R_5$ and $R_6$ are each selected from the group consisting of $C_1$–$C_6$ alkyl, phenyl, $C_1$–$C_6$ chloro or bromo-substituted alkyl, $C_1$–$C_4$ alkylthio, thiophenyl optionally substituted by chlorine, bromine, $C_1$–$C_4$ alkyl or nitro, $C_1$–$C_4$ alkylsulfoxide, $C_1$–$C_4$ alkylsulfonyl, $C_1$–$C_4$ alkoxy, $C_2$–$C_5$ alkoxyalkyl, $C_1$–$C_6$ monoalkylamino and $C_2$–$C_6$ dialkyl amino, cyano, thiocyano, $C_2$–$C_6$ alkenyl, $C_3$–$C_6$ alkynyl, nitro, $C_3$–$C_6$ cycloalkyl and $C_5$–$C_6$ cycloalkenyl wherein $R_5$ and $R_6$ may or may not be the same; X and Y can be O or S; and $n$ is an integer ranging from 1 to 3.

2. A compound according to claim 1, S-[1,5,5-trimethylbarbituryl-3-methyl]-0,0-dimethylphosphorothioate.

3. A compound according to claim 1, S-[1,5,5-trimethylbarbituryl-3-methyl]-0-ethyl-S-propylphosphorodithioate.

4. A compound according to claim 1, S-[1,5,5-trimethylbarbituryl-3-methyl]-0,0-dimethylphosphorodithioate.

5. A compound according to claim 1, S-[1,5,5-trimethylbarbituryl-3-methyl]-0,0-diethylphosphorodithioate.

6. A compound according to claim 1, S-[1,5,5-trimethylbarbituryl-3-methyl]-0,0-diethylphosphorothioate.

7. A compound according to claim 1, S-[1,5,5-trimethylbarbituryl-3-methyl]-ethyl-0-ethylphosphonodithioate.

8. A compound according to claim 1, S-[1,5-dimethyl-5-(1-cyclohexenyl)barbituryl-3-methyl]-0-ethyl-S-propylphosphorodithioate.

9. A compound according to claim 1, S-[1,5-dimethyl-5-(1-cyclohexenyl)barbituryl-3-methyl]-0,0-diethylphosphorothioate.

10. A compound according to claim 1, S-[1,5-dimethyl-5-(1-cyclohexenyl)barbituryl-3-methyl]-0,0-diethylphosphorodithioate.

11. A compound according to claim 1, S-[1,5-dimethyl-5-(1-cyclohexenyl)barbituryl-3-methyl]-0,0-dimethylphosphorodithioate.

12. A compound according to claim 1, S-[1,5-dimethyl-5-(1-cyclohexenyl)barbituryl-3-methyl]-0,0-dimethylphosphorothioate.

13. A compound according to claim 1, S-[1,5-dimethyl-5-(1-cyclohexenyl)barbituryl-3-methyl]-ethyl-0-ethylphosphonodithioate.

14. A compound according to claim 1, S-[1-methyl-5,5-diethylbarbituryl-3-methyl]-0,0-dimethylphosphorothioate.

15. A compound according to claim 1, S-[1-methyl-5,5-diethylbarbituryl-3-methyl]-0-ethyl-S-propylphosphorodithioate.

16. A compound according to claim 1, S-[1-methyl-5,5-diethylbarbituryl-3-methyl]-ethyl-0-ethylphosphonodithioate.

* * * * *